United States Patent
Kona et al.

(10) Patent No.: US 9,139,724 B2
(45) Date of Patent: Sep. 22, 2015

(54) TALC CONTAINING POLYPROPYLENE COMPOSITION WITH EXCELLENT THERMOMECHANICAL PROPERTIES

(71) Applicants: Rao Balakantha Kona, Vienna (AT); Stefan Schiesser, Linz (AT); Andreas Hauer, Kirchschlag (AT); Hansjorg Pramer, Gramastetten (AT)

(72) Inventors: Rao Balakantha Kona, Vienna (AT); Stefan Schiesser, Linz (AT); Andreas Hauer, Kirchschlag (AT); Hansjorg Pramer, Gramastetten (AT)

(73) Assignee: Borealis AG, Vienna (AT)

( * ) Notice: Subject to any disclaimer, the term of this patent is extended or adjusted under 35 U.S.C. 154(b) by 0 days.

(21) Appl. No.: 14/372,242

(22) PCT Filed: Jan. 16, 2013

(86) PCT No.: PCT/EP2013/000114
§ 371 (c)(1),
(2) Date: Jul. 15, 2014

(87) PCT Pub. No.: WO2013/113470
PCT Pub. Date: Aug. 8, 2013

(65) Prior Publication Data
US 2014/0371371 A1    Dec. 18, 2014

(30) Foreign Application Priority Data
Feb. 1, 2012   (EP) .................................... 12000652

(51) Int. Cl.
*C08L 23/12*   (2006.01)
*C08K 3/34*    (2006.01)
*C08L 23/10*   (2006.01)
*C08L 23/14*   (2006.01)

(52) U.S. Cl.
CPC . *C08L 23/12* (2013.01); *C08K 3/34* (2013.01); *C08L 23/10* (2013.01); *C08L 23/142* (2013.01); *C08K 3/346* (2013.01); *C08L 2205/03* (2013.01); *C08L 2207/02* (2013.01)

(58) Field of Classification Search
CPC ........... C08K 3/34; C08L 23/12; C08L 23/16; C08L 2205/03
See application file for complete search history.

(56) References Cited

U.S. PATENT DOCUMENTS

| | | | |
|---|---|---|---|
| 2001/0006990 A1 | 7/2001 | Jeong et al. | |
| 2002/0123572 A1 | 9/2002 | Park et al. | |

FOREIGN PATENT DOCUMENTS

| | | | |
|---|---|---|---|
| EP | 2368938 A1 * | 9/2011 | |
| JP | 1271451 | 4/1988 | |

OTHER PUBLICATIONS

International Search Report mailed Feb. 18, 2013 for International Application No. PCT/EP2013/000114.
Written Opinion mailed mailed Feb. 18, 2013 for International Application No. PCT/EP2013/000114.

* cited by examiner

Primary Examiner — Vickey Nerangis
(74) Attorney, Agent, or Firm — Fay Sharpe LLP

(57) ABSTRACT

The invention pertains to a polypropylene composition consisting of: 55 to 79 wt % base polymer mix; 18 to 44.5 wt % talc; and 0.5 to 3 wt % additives based on the total weight of the polypropylene composition, the base polymer mix containing a XCU fraction and a XCS fraction and the XCU fraction being present in an amount of 91 to 98 wt % and the XCS fraction being present in an amount of 2 to 9 wt %; the base polymer mix containing a comonomer content of less than 5 wt % with respect to the base polymer mix; the talc having a d50 median particle size of 1.0 to 3.0 μm when measured according to ISO 13317-3 15 using a Sedigraph; and the composition having a MFR (230° C./2.16 kg; ISO 1133) of 1 to 10 g/10 min. a process for the production of such a polypropylene composition and article comprising said polypropylene composition.

21 Claims, No Drawings

TALC CONTAINING POLYPROPYLENE COMPOSITION WITH EXCELLENT THERMOMECHANICAL PROPERTIES

The present inventions relates to a polypropylene composition comprising a polymer mix in combination with talc having excellent thermomechanical properties, low sag performance as well as good drop performance, in particular at low temperatures. Furthermore, the invention relates to a production process of the polypropylene composition, the use of such a composition and to articles made from the polypropylene composition.

Basement and housing parts of many modern home appliances are increasingly made of plastics. However, the demands made on plastics used for these parts are high, especially when they are frequently exposed to elevated temperatures, for instance due to the operation of the appliance. This is especially true for home appliances like washing machines, dryers, dishwashers etc., since for instance in dish washers the temperature can exceed 50° C. and in washing machines the water temperature can rise up to 95° C. High temperatures weaken the plastic and lead to deformation thereof. Thus, once the appliance is fully loaded basements made of conventional polypropylene grades tend to sag more than 5 mm. Accordingly plastic compositions are required that do not deform over the years of operation. Hence, excellent thermomechanical properties and a good low sag performance, i.e. low sagging values of the plastic are indispensable for a good-quality basement.

To comply with that demand stiff plastics are typically used. It is well known in the art how to produce plastics with high stiffness for instance by combining homopolypropylene with a large amount of talc, i.e. more than 40 wt %. However, the resulting polymer is not ductile. It is very brittle and unelastic and easily cracks as a consequence of mechanical stress. Accordingly, basements made from conventional plastics easily crack when the home appliance is hit or dropped. In addition, these undesired properties are even deteriorated at lower temperatures.

However, a good dropping performance is of increasing relevance since the transport processes and length of transport ways per item have dramatically increased over the last years due to online-ordering and deliveries and return deliveries associated therewith. Hence, endurance without prejudice is very desirable when the packaged home appliance is dropped from 1 meter highness. Damages to the machines due to dropping during transporting meanwhile constitute an expense factor for companies, traders and delivery services that cannot be neglected anymore for longer. Dropping of the machines almost exclusively occurs in the warehouses and outside during uploading and unloading of the transport vehicles. Therefore the dropping performance has to be particularly good at low temperatures around 0° C. to 10° C.

Accordingly, in addition to the conventionally demanded properties like good thermomechanical properties, stiffness and low sag performance at high temperatures there is also the need for a good performance of the material in impact puncture and drop test.

It is known to use heterophasic polypropylene in combination with a minor amount of talc, preferably very fine talc for obtaining high ductility. A first limitation occurs from the fineness of the talc, since fine talc leads to agglomerates and therefore the talc's distribution in the plastic is deteriorated with increasing fineness causing in the end bad impact properties. However, increasing of the impact properties leads at the same time to lowering of the elastic modulus. Additionally, the plastic is of reduced stiffness at higher temperatures, concomitantly the sagging values worsening towards higher values. There is still the need for a composition meeting these contradicting requirements as good low sag performance, i.e. a low sagging values, at higher temperatures and good ductility at lower temperatures have been seen as nearly mutually exclusive.

US2001/0006990-A1 relates to a polyolefine-based composite resin comprising 40 to 80 wt % a crystalline ethylene-propylene comonomer, 5 to 40 wt % of an ethylene-α-olefin copolymer, 5 to 30 wt % calcium-metasilicate based wollastonite and 5 to 40 wt % of an inorganic reinforcing agent.

US2002/0123572-A1 discloses a polyolefine-based composite resin comprising 30 to 80 wt % a crystalline ethylene-propylene comonomer, 5 to 40 wt % of an ethylene-α-olefin copolymer and 5 to 40 wt % of an inorganic filler.

JP01271451-A reports the preparation of a composition by mixing high-rigidity propylene/ethylene block copolymer in which the streoregularity of the propylene homopolymer part is high with two amorphous ethylene-propylene-copolymers and calcium carbonate particles and talc particles with 3 mm or less of average particle size.

However, there is still the need for materials having improved drop performance and good ductility at low temperatures and simultaneously providing low sagging behavior at higher temperatures.

The present invention is based on the finding that the above object can be achieved by combining a base polymer mix with talc of medium fineness.

Hence the present invention provides a polypropylene composition
consisting of
55 to 79 wt % base polymer mix;
18 to 44.5 wt % talc; and
0.5 to 3 wt % additives
based on the total weight of the polypropylene composition,
the base polymer mix containing a XCU fraction and a XCS fraction and the XCU fraction being present in an amount of 91 to 98 wt % and the XCS fraction being present in an amount of 2 to 9 wt %;
the base polymer mix containing a comonomer content of less than 5 wt % with respect to the base polymer mix;
the talc having a d50 median particle size of 1.0 to 3.0 µm when measured according to ISO 13317-3 15 using a Sedigraph; and
the composition having a MFR (230° C./2.16 kg; ISO 1133) of 1 to 10 g/10 min.

The term "polypropylene" denotes a propylene homo- or copolymer or a mixture of such propylene homo- or copolymers.

The polypropylene composition of the present invention has an MFR (230° C./2.16 kg; ISO 1133) of 1 to 10 g/10 min, preferably of 1.9 to 8 g/10 min, more preferably of 2.0 to 6 g/10 min, even more preferably of 2.2 to 5 g/10 min and most preferably of 2.3 to 4 g/10 min.

According to the present invention the polypropylene composition comprises 18 to 44.5 wt % talc. Preferably the polypropylene composition comprises 23 to 40 wt %, more preferably 25 to 36 wt %, even more preferably 27 to 33 wt % and most preferably 29 to 31 wt % talc, based on the total weight of the polypropylene composition.

According to the present invention the talc has a d50 median particle size of 1 to 3 µm when measured on uncompacted material according to ISO 13317-3 15 using a Sedigraph. In a preferred embodiment the d50 median particle size is 1.2 to 2.5 µm, more preferably 1.5 to 2.3 µm and most preferably 1.7 to 2.1 µm.

It is further preferred that the d95 cutoff particle size of the talc is 3 to 9 µm, more preferably 4 to 8 µm, even more preferably 5 to 7 µm and most preferably less than 6.5 µm when measured on uncompacted material according to ISO 13317-3 using a Sedigraph.

In a further aspect the talc has a specific surface area of 7.5 to 9 m$^2$/g, preferably of 7.7 to 8.5 m$^2$/g and most preferably of 7.9 to 8.1 m$^2$/g determined as the BET surface according to DIN 66131/2.

In a further aspect the specific surface area according to Blaine of the talc is preferably 28000 to 40000, more preferably 30000 to 38000, even more preferably 32000 to 36000 and most preferably 33000 to 35000 when measured with Blaine 10.

In principle any talc can be used having the above described properties. The used talc is preferably of the above describes medium fineness. Finer talc leads to agglomerates and therefore to a deteriorated distribution of the talc when blending the polypropylene composition. Coarser talc cannot provide for the excellent mechanical performance of the polypropylene composition in the instrumented puncture test especially at low temperatures. The talc may be included during or after the polymerisation process of the polymers used for the base polymer mix. Usually the talc is added to the polypropylene composition after the polymerisation process. An example for a preferred talc is the type of STEAMIC T1 distributed by Luzenac.

Furthermore the polypropylene composition of the present invention comprises additives in a total amount of 0.5 to 3 wt % based on the total weight of the polypropylene composition. Preferably, additives are comprised in a total amount of 0.7 to 2.8 wt % and more preferably of 1.0 to 2.5 wt % with respect to the total weight of the polypropylene composition. These additives may be included during the polymerisation process of the polymers used for obtaining the base polymer mix and/or they may be added to the polypropylene composition before, during or after blending. Suitable additives of the present invention include miscible thermoplastics, antioxidants, stabilizers, UV stabilizers, antistatic agents, lubricants, demoulding agents, nucleating agents, fillers, colouring agents, and foaming agents.

Additionally, the present polypropylene composition comprises a base polymer mix in an amount of 55 to 79 wt %, preferably of 60 to 72 wt % and most preferably of 66 to 69 wt %, based on the total weight of the polypropylene composition.

The XCU fraction is denoted the fraction of the base polymer mix that is not soluble in p-xylene at 25° C. in the test as described in the experimental part.

According to the present invention the XCU fraction of the base polymer mix is present in an amount of 85 to 95 wt %, preferably of 87 to 92 wt %, more preferably of 88 to 91 wt %, most preferably of 89 to 90 wt % in the polypropylene composition.

The XCS fraction is denoted the fraction of the base polymer mix that is soluble in p-xylene at 25° C. in the test as described in the experimental part.

According to the present invention the XCS fraction of the base polymer mix is present in an amount of 5 to 15 wt %, preferably of 8 to 13 wt %, more preferably of 9 to 12 wt %, most preferably from 10 to 11 wt % in the polypropylene composition.

The comonomer content, more preferably the $C_2$-total content, of the base polymer mix is less than 5 wt % based on the total weight of the base polymer mix. Preferably the comonomer content is less than 3.5 wt % and even more preferably it is less than 2.5 wt % when determined according to IR analysis described in the experimental part.

In a preferred aspect, the maximum force in the instrumented puncture test at 0° C. of the polypropylene composition according to the present invention is preferably more than 800 N, when measured according to ISO 6603-2 as described in the Examples. More preferably it is 850 N or higher, even more preferably 950 N or higher and most preferably 1000 N or higher. Usually, the maximum force in the instrumented puncture test at 0° C. will not be higher than 1500 N. Furthermore, the puncture energy in the instrumented puncture test at 0° C. is preferably more than 1.5 J, more preferably more than 1.9 J and most preferably more than 2.1 J.

Furthermore, the maximum force in the instrumented puncture test at 23° C. of the polypropylene composition is preferably more than 1800 N and more preferably more than 1850 N, when measured according to ISO 6603-2 as described in the Examples. Furthermore, the puncture energy in the instrumented puncture test at 23° C. is preferably more than 6.3 J, more preferably 6.8 to 8 J and most preferably more than 7 J.

Preferably, the polypropylene composition has an unnotched Charpy Impact Resistance at +23° C. of at least 50 kJ/m$^2$, more preferably of at least 55 kJ/m$^2$ and most preferably of at least 57.1 kJ/m$^2$ determined according to ISO 179-1/1eU. Generally the unnotched Charpy Impact Resistance at 23° C. is not higher than 70 kJ/m$^2$.

Preferably, the polypropylene composition has an unnotched Charpy Impact Resistance at 0° C. of at least 25 kJ/m$^2$, more preferably of at least 27 kJ/m$^2$ and most preferably of at least 29 kJ/m$^2$ determined according to ISO 179-1/1eU. Generally the Unnotched Charpy Impact Resistance at 0° C. is not higher than 50 kJ/m$^2$.

Additionally, the tensile modulus/talc ratio of the present polypropylene composition is preferably more than 110 MPa/wt %, when the tensile modulus is measured according to ISO 527-2 and the weight of the talc is based on the total weight of the polypropylene composition. More preferably the tensile modulus/talc ratio is 116 to 145 MPa/wt %, even more preferably 117 to 135 MPa/wt % and most preferably 119 to 130 MPa/wt %.

Additionally, the flexural modulus/talc ratio of the present polypropylene composition is preferably more than 113 MPa/wt %, when the tensile modulus is measured according to ISO 178 and the weight of the talc is based on the total weight of the polypropylene composition. More preferably the tensile modulus/talc ratio is 117 to 146 MPa/wt %, even more preferably 118 to 138 MPa/wt % and most preferably 120 to 132 MPa/wt %.

Moreover, the flexural modulus/talc ratio of the present polypropylene composition is preferably more than 60 MPa/wt %, when the flexural modulus is measured according to ISO 178 at an elevated temperature of 50° C. as described in the experimental part and the weight of the talc is based on the total weight of the polypropylene composition. More preferably the flexural modulus/talc ratio measured this way is 61 to 85 MPa/wt %, even more preferably 62 to 80 MPa/wt % and most preferably 63 to 75 MPa/wt % and the weight of the talc is based on the total weight of the polypropylene composition.

Moreover, the flexural modulus/talc ratio of the present polypropylene composition is preferably more than 35 MPa/wt %, when the flexural modulus is measured according to ISO 178 at an elevated temperature of 80° C. as described in the experimental part and the weight of the talc is based on the total weight of the polypropylene composition. More preferably the flexural modulus/talc ratio measured this way is 36 to 48 MPa/wt %, even more preferably 37 to 46 MPa/wt % and most preferably 38 to 44 MPa/wt % and the weight of the talc is based on the total weight of the polypropylene composition.

Preferably the base polymer mix of the present polypropylene composition is obtainable by blending 50 to 65 wt % homopolymer (A) having an MFR (230° C./2.16 kg; ISO 1133) of 0.3 to 2 g/10 min;

20 to 32 wt % heterophasic polypropylene (B) having an MFR (230° C./2.16 kg; ISO 1133) of 5 to 15 g/10 min and a flexural modulus of more than 850 MPa when measured according to ISO 178; and 10 to 20 wt % homopolymer (C) having an MFR (230° C./2.16 kg; ISO 1133) of more than or equal to 10 g/10 min based on the total weight of the base polymer mix.

The base polymer mix according to the present invention preferably comprises a homopolymer (A) having an MFR (230° C./2.16 kg; ISO 1133) of 0.3 to 2 g/10 min; a heterophasic polypropylene (B) having an MFR (230° C./2.16 kg; ISO 1133) of 5 to 15 g/10 min; and a homopolymer (C) having an MFR (230° C./2.16 kg; ISO 1133) of more than or equal to 10 g/10 min. Further preferably the base polymer mix according to the present invention consists of a homopolymer (A) having an MFR (230° C./2.16 kg; ISO 1133) of 0.3 to 2 g/10 min; a heterophasic polypropylene (B) having an MFR (230° C./2.16 kg; ISO 1133) of 5 to 15 g/10 min; and a homopolymer (C) having an MFR (230° C./2.16 kg; ISO 1133) of more than or equal to 10 g/10 min and (a) further polymeric compound(s) in an amount of less than 8 wt.-% with respect to the total weight of (A)+(B)+(C)+(further polymeric compound(s)). Even more preferably the base polymer mix according to the present invention consists of a homopolymer (A) having an MFR (230° C./2.16 kg; ISO 1133) of 0.3 to 2 g/10 min; a heterophasic polypropylene (B) having an MFR (230° C./2.16 kg; ISO 1133) of 5 to 15 g/10 min; and a homopolymer (C) having an MFR (230° C./2.16 kg; ISO 1133) of more than or equal to 10 g/10 min. Most preferably the base polymer mix according to the present invention consists of 50 to 65 wt % homopolymer (A) having an MFR (230° C./2.16 kg; ISO 1133) of 0.3 to 2 g/10 min; 20 to 32 wt % heterophasic polypropylene (B) having an MFR (230° C./2.16 kg; ISO 1133) of 5 to 15 g/10 min; and 10 to 20 wt % homopolymer (C) having an MFR (230° C./2.16 kg; ISO 1133) of more than or equal to 10 g/10 min with respect to the total weight of (A)+(B)+(C).

Further preferred ways of providing the present polypropylene composition are explained in the following.

Preferably, blending occurs by a melt mixing process. Typical devices for performing said melt mixing process are twin screw extruders, single screw extruders optionally combined with static mixers, chamber kneaders such as Farell kneaders, and reciprocal co-kneaders, for example Buss co-kneaders. Preferably, the melt mixing process is carried out in a twin screw extruder with high intensity mixing segments. Further preferably the melt mixing is carried out at a temperature of 20 to 50° C. above the melting point of the polymer component present having the highest melting point in the composition, but below the stability limit temperature of the polymer component present having the lowest thermal stability in the composition.

Furthermore, the homopolymer (A), the heterophasic polypropylene (B) and/or the homopolymer (C) comprise additives in an amount of 0.1 to 5.0 wt %, more preferably of 0.2 to 3.5 wt % and most preferably of 0.23 to 3.0 wt % based on the total weight of the homopolymer (A), the heterophasic polypropylene (B) and/or the homopolymer (C), respectively. These additives may be included during or after the polymerisation process or in the compounding step. Suitable additives include miscible thermoplastics, antioxidants, stabilizers, UV stabilizers, antistatic agents, lubricants, demoulding agents, nucleating agents, fillers, colouring agents, and foaming agents.

Preferably the base polymer mix is obtainable by blending 53 to 61 wt %, more preferably 55 to 60 wt % and most preferably 57 to 59.5 wt % of homopolymer (A), based on the total weight of the base polymer mix.

Preferably, the homopolymer (A) has an MFR (230° C./2.16 kg; ISO 1133) of 0.3 to 2 g/10 min, more preferably 0.5 to 1.2 g/10 min, even more preferably of 0.6 to 0.9 g/10 min and most preferably of 0.7 to 0.8 g/10 min.

Preferably, the XCU fraction of the homopolymer (A) is present in an amount of 94 to 99 wt %, preferably of 95 to 98 wt % and most preferably of 96.5 to 97.5 wt % based on the weight of the homopolymer (A). Accordingly, the XCS fraction of the homopolymer (A) is preferably present in an amount of 1 to 6 wt %, more preferably of 2 to 5 wt % and most preferably of 2.5 to 3.5 wt % based on the weight of the homopolymer (A).

Furthermore homopolymer (A) preferably comprises additives in an amount of 0.1 to 0.5 wt % based on the total weight of the homopolymer (A). More preferably, additives are comprised in an amount of 0.2 to 3.5 wt % and most preferably of 0.25 to 3.3 wt %. These additives may be included during or after the polymerisation process. Suitable additives include miscible thermoplastics, antioxidants, stabilizers, lubricants, demoulding agents, nucleating agents, fillers, talc, colouring agents, and foaming agents.

The heterophasic polypropylene (B) is an elastomer modified polypropylene with a multiphase structure. The heterophasic polypropylene (B) has a polypropylene homo- or copolymer matrix and a rubber phase which are usually $C_2C_3$ rubber. Usually the rubber is ethylen-propylene-rubber. Accordingly the heterophasic polypropylene (B) preferably comprises ethylene as comonomer. Alternatively the heterophasic polypropylene (B) may further comprise higher α-olefins as copolymers. Preferably the matrix is a polypropylene homopolymer.

Furthermore, the base polymer mix is obtainable by blending preferably 22 to 30 wt %, more preferably 24 to 28 wt % and most preferably 25.5 to 27.5 wt % of heterophasic polypropylene (B), based on the total weight of the base polymer mix.

Additionally, the heterophasic polypropylene (B) has an MFR (230° C./2.16 kg; ISO 1133) of preferably 5 to 20 g/10 min, more preferably of 7 to 14 g/10 min and most preferably of 10 to 13 g/10 min.

Preferably, the XCU fraction of the heterophasic polypropylene (B) is present in an amount of 75 to 61 wt %, preferably of 65 to 72 wt % and most preferably of 68 to 69 wt % based on the weight of the heterophasic polypropylene (B). Accordingly, the XCS fraction of the heterophasic polypropylene (B) is present in an amount of 25 to 39 wt %, preferably of 28 to 35 wt %, even more preferably 30 to 33 wt % and most preferably of 31 to 32 wt % based on the weight of the heterophasic polypropylene (B).

Furthermore, the instrinsic viscosity IV of the XCS fraction of the heterophasic polypropylene (B) is preferably 2.1 to 2.9 dl/g, more preferably 2.3 to 2.7 dl/g and most preferably 2.4 to 2.6 dl/g when measured in decalin at 135° C. according to DIN EN ISO 1628-1 and -3.

The total comonomer amount, more preferably the total $C_2$ amount of the heterophasic polypropylene (B) is preferably 9 to 17 wt %, more preferably 11.5 to 14.5 wt % and most preferably 12.5 to 13.5 wt % based on the weight of the heterophasic polypropylene and when measured with Fourier transform infrared spectroscopy (FTIR) as described in the experimental part.

Furthermore, the flexural modulus of the heterophasic polypropylene (B) is more than 850 MPa, preferably more than 900 MPa, more preferably more than 950 MPa and most preferably more than or equal to 1000 MPa when measured according to ISO 178.

In a preferred embodiment the heterophasic polypropylene (B) is produced in a multi-stage process. Multistage processes involve the production by reactors coupled in series and/or the production by multi-reaction zone reactors. A typical combination for reactors coupled in series is the use of a bulk/gas phase reactor serious, whereby the bulk reactor is preferably a loop reactor.

Preferably the multi-stage process is a four-stage process, wherein the heterophasic polypropylene (B) is produced in 4 sequential reactors couples in series. More preferably the 4 sequential reactors are a combination of one loop reactor and three gas phase reactors couples in series. The component forming the matrix is produced in the first and the second stage, i.e. in the loop reactor, than it is transferred to the second stage, i.e. in first gas phase reactor, and the production is continued in the second stage. The intermediate is further transferred to the third stage, i.e. to the second gas phase reactor, and the production is continued. Than it is finally transferred to the fourth stage, i.e. the third gas phase reactor, and the production is continued.

Hence, the production of the heterophasic polypropylene (B) preferably involves
- the preparation of a first polymer in a loop reactor having an MFR (230° C./2.16 kg; ISO 1133) of 50 to 60 g/10 min;
- transferring the product to a first gas phase reactor for the preparation of a second polymer having an MFR (230° C./2.16 kg; ISO 1133) of 50 to 60 g/10 min;
- transferring the product to a second gas phase reactor for the preparation of a third polymer having an MFR (230° C./2.16 kg; ISO 1133) of 10 to 25 g/10 min; and
- transferring the product to a third gas phase reactor for the preparation of the heterophasic polypropylene (B) having an MFR (230° C./2.16 kg; ISO 1133) of 5 to 20 g/10 min and a flexural modulus of more than 850 MPa when measured according to ISO 178.

All preferred ranges given above also apply for a composition comprising heterophasic polypropylene (B) obtainable by this process outlined above and described in further details in the following.

It is preferred that the XCS fraction of the first polymer is 0 to 3 dl/g when measured in decalin at 135° C. according to DIN EN ISO 1628-1 and -3.

Moreover, it is preferred that the polymer obtained from the second gas phase reactor has a comonomer content of more than 7 wt % and more preferably of 8 to 10 wt.

It is preferred that the XCS fraction of the polymer obtained from the second gas phase reactor is more than 18 dl/g and more preferably 19 to 23 dl/g when measured in decalin at 135° C. according to DIN EN ISO 1628-1 and -3.

Preferably, homopolymer (C) is a controlled crystallinity polypropylene (CCPP). A controlled crystallinity polypropylene is a polypropylene homopolymer having a melting point of 164° C. or higher.

Preferably, homopolymer (C) is a nucleated homopolymer containing a polymeric nucleating agent. Preferably, the polymeric nucleating agent is vinylcyclohexane. Additionally, the homopolymer (C) has an MFR (230° C./2.16 kg; ISO 1133) of more than or equal to 10 g/10 min, preferably of 15 to 50 g/10 min, more preferably of 15 to 30 g/10 min and most preferably of 18 to 25 g/10 min.

Preferably, the XCU fraction of the homopolymer (C) is present in an amount of 98 wt % based on the weight of the homopolymer (C). Accordingly, the XCS fraction of the homopolymer (C) is present in an amount of less than 2 wt % based on the weight of the homopolymer (C).

The homopolymer (C) is preferably produced in a multi-stage process in a multi-stage reaction sequence. A two-stage process including two sequential reactors is already sufficient.

Preferably homopolymer (C) is identical with Component A of European Patent Application EP 1 357 144 A1 incorporated herein by reference.

Furthermore the present invention relates to an article made from the present polypropylene composition. More preferably the present invention relates to an article for a home appliance and most preferably to a basement of a home appliance. This article is especially suitable for exposure to elevated temperatures or heat, i.e. to temperatures above 45° C. and less than 95° C. The basements are especially useful for home appliances selected from the group of like dish washers, washing machines, refrigerator, freezers, tumble-dryers, and the like.

Further, the present invention relates to articles comprising the polypropylene composition according to the present invention or to articles made of the present polypropylene composition. The article is produced by any common conversion process suitable for thermoplastic polymers like injection moulding, extrusion blow moulding, injection stretch blow moulding or cast film extrusion. Furthermore, the present polypropylene composition is suitable to be processed with the conventional tools already used in the industry, because the shrinkage behaviour is unchanged compared to the conventional polypropylene composition presently used in the industry and described herein in the Comparative Example.

Still further, the present invention relates to the use of the present polypropylene composition for obtaining an article according to the invention, for producing an article, particularly an article as described above, having a low sag performance and good performance in the instrumented punctured test.

More particularly, the present invention relates to the use of a heterophasic polypropylene (B) having an MFR (230° C./2.16 kg; ISO 1133) of 5 to 20 g/10 min and a flexural modulus of more than 850 MPa when measured according to ISO 178 and a talc having a d50 median particle size of 1.0 to 3.0 μm when measured according to ISO 13317-3 15 using a Sedigraph for obtaining a flexural modulus/talc ratio of a polypropylene composition containing talc of more than 60 MPa/wt %, when the flexural modulus is measured according to ISO 178 at an elevated temperature of 50° C. as described in the experimental part and the weight of talc is based on the total weight of the polypropylene composition.

Furthermore, the present invention relates to the use of a heterophasic polypropylene (B) having an MFR (230° C./2.16 kg; ISO 1133) of 5 to 20 g/10 min and a flexural modulus of more than 850 MPa when measured according to ISO 178 and a talc having a d50 median particle size of 1.0 to 3.0 μm when measured according to ISO 13317-3 15 using a Sedigraph for obtaining a flexural modulus/talc ratio of a polypropylene composition containing talc of more than 35 MPa/wt %, when the flexural modulus is measured according to ISO 178 at an elevated temperature of 80° C. as described in the experimental part and the weight of talc is based on the total weight of the polypropylene composition.

In the following, the present invention is described by way of examples.

EXAMPLES

Definition of Test Methods a) Melt Flow Rate

The melt flow rate (MFR) is determined according to ISO 1133 and is indicated in g/10 min. The MFR is an indication of the flowability, and hence the processability, of the polymer. The higher the melt flow rate, the lower the viscosity of the polymer. The $MFR_2$ of polypropylene is determined at a temperature of 230° C. and a load of 2.16 kg.

b) Xylene Soluble Fraction

The xylene soluble fraction (XCS) as defined and described in the present invention is determined as follows: 2.0 g of the polymer were dissolved in 250 ml p-xylene at 135° C. under agitation. After 30 minutes, the solution was allowed to cool for 15 minutes at ambient temperature and then allowed to settle for 30 minutes at 25±0.5° C. The solution was filtered with filter paper into two 100 ml flasks. The solution from the first 100 ml vessel was evaporated in nitrogen flow and the residue dried under vacuum at 90° C. until constant weight is reached. The xylene soluble fraction (percent) can then be determined as follows:

$$XCS\% = (100 \times m_1 \times v_0)/(m_0 \times v_1),$$

wherein $m_0$ designates the initial polymer amount (grams), $m_1$ defines the weight of residue (grams), $v_0$ defines the initial volume (milliliter) and $v_1$ defines the volume of the analysed sample (milliliter). The fraction insoluble in p-xylene at 25° C. (XCU) is then equal to 100%−XCS %.

c) Intrinsic Viscosity

The intrinsic viscosity (IV) value increases with the molecular weight of a polymer. The intrinsic viscosity s measured in decalin at 135° C. according to DIN EN ISO 1628-1 and -3.

d) Tensile Tests: Tensile Modulus (Elastic Modulus) and Tensile Strength

Tensile tests are performed according to ISO 527-2 at +23° C. on injection molded specimen (type 1B, 4 mm thickness) prepared by injection moulding in line with ISO 1873-2.

Tensile modulus (in MPa) was determined according to ISO 527-2. The measurement was conducted at 23° C. temperature with a cross head speed of 1 mm/min for determining Tensile Modulus and 50 mm/min for determining tensile strength. The tensile modulus (Elastic modulus) was calculated from the linear part of said tensile test results, conducting that part of the measurement with an elongation rate of 5 mm/min.

For determining tensile strength (in MPa) the aforementioned tensile test according to ISO 527-2 at +23° C. was continued with an elongation rate of 50 mm/min until the specimen broke.

e) Flexural Tests: Flexural Modulus and Flexural Strength

Flexural modulus and flexural strength are measured according to ISO 178 using injection molded test specimen as described in EN ISO 1873-2 with dimensions of 80×10×4 $mm^3$. Crosshead speed was 2 mm/min for determining the flexural modulus and 50 mm/min for determining the flexural strength, flexural strain at flexural strength, flexural stress at 3.5% strain, flexural stress at break and flexural strain at break.

For the tests at elevated the following procedure was applied: Test specimens having a size of 80×10×4 $mm^3$ were molded according to EN ISO 1873-2. The dimensions of the test specimens were determined before putting them into the thermo chamber. The test specimens were stored for 96 hours at standard climate (23° C., 50% relative humidity). Subsequently, the test specimens were stored in the thermo chamber at the targeted temperature of 50° C. or 80° C. respectively for at least 1 hour. The testing was done immediately afterwards within the thermo chamber set up around the flexural testing device. Crosshead speed remained unchanged when compared to the measurement at standard conditions.

f) Charpy Impact Resistance Test: Unnotched and Notched Charpy Impact Strength

All Charpy Impact Resistances/Strengths were determined on samples with dimensions of 80×10×4 $mm^3$. When not otherwise stated a standard impact velocity of 2.9 m/s was used. The test specimens were prepared by injection moulding using an IM V 60 TECH machinery in line with ISO 1873-2. The melt temperature was 200° C. and the mold temperature was 40° C.

The Unnotched Charpy Impact Resistance/Strength was determined according to ISO 179-1eU on said samples which were non-notched at a temperature of +23° C. (Unnotched Charpy Impact Strength (+23° C.)) and of 0° C. (Unnotched Charpy Impact Strength (0° C.)).

The Notched Charpy Impact Resistance/Strength (NIS) was determined according to ISO 179-1eA on said samples which were notched at a temperature of −20° C. (Notched Charpy Impact Strength (20° C.)).

g) Heat Deflection Temperature (HDT)

The HDT was determined on injection molded test specimens of 80×10×4 $mm^3$ prepared according to ISO 1873-2 and stored at +23° C. for at least 96 hours prior to measurement. The test was performed on flatwise supported specimens according to ISO 75, condition A, with a nominal surface stress of 1.8 MPa. Furthermore, the test was performed on flatwise supported specimens according to ISO 75, condition B, with a nominal surface stress of 0.45 MPa.

h) VICAT-Test: VICAT A and VI/CAT B

The Vicat softening temperatures VICAT A (VICAT Met.A) using a test load of 10 N, and VICAT B (VICAT Met.B) using a test load of 50 N are measured according to ISO 306 using injection molded test specimen (80×10×4 $mm^3$) as described in EN ISO 1873-2.

i) Shrinkage: SH in Flow and SH Across Flow

The shrinkage was measured on injection molded rectangular plates of 150×80×2 $mm^3$ filled with a triangular distributor and a 0.5 mm thick film gate along the shorter side. A melt temperature of 260° C., a mold temperature of 60° C. and an injection speed at the gate of 100 mm/s were used for producing the specimens which were cut free from the distributor immediately after demolding. The specimens were then stored at +23° C. for 96 hours and the relative shrinkage against the mold dimension was determined in both longitudinal (SH in flow) and transversal direction (SH across flow), measuring in the center of the specimen in each case. For determining average values 10 specimens were tested, and the difference was calculated from the averages.

j) Instrumented Puncture Test

The Instrumented Puncture Test was determined according to ISO 6603-2 at 4.4 m/s bolt-speed, lubricated bolt and clamped specimen. The specimen used were injection-molded plates as described in EN ISO 1873-2 with dimensions of 60×60×2 mm$^3$. The test was performed at 23° C. and 0° C.

k) Ethylene Content/Comonomer Content

The relative amount of $C_2$ in the polymer was measured with Fourier transform infrared spectroscopy (FTIR). When measuring the ethylene content in polypropylene, a thin film of the sample (thickness about 250 mm) was prepared by hot-pressing. The area of —$CH_2$— absorption peak (800-650 cm$^{-1}$) was measured with Perkin Elmer FTIR 1600 spectrometer. The method was calibrated by ethylene content data measured by $^{13}$C-NMR. The relative amount of $C_2$ is described as $C_2$-total and given in wt %.

l) Specific Surface of Filler

The specific surface of the talc is determined according to DIN 66131/2 using the BET method.

Furthermore, the specific surface is determined according to the Blaine-method using Blaine 10.

Preparation of Inventive and Comparative Examples

Homopolymer (A) and Homopolymer (C)

Homopolymers (A) and (C) were commercially available homopolymers having the properties according to Table 1. Both homopolymers have been obtained by a 4$^{th}$-generation ZN-catalyst and C-donor (cylcohexylmethyldimethoxy silane) in the case of homopolymer (A) and D-donor (dicyclopentyldimethoxysilane) in the case of polymer (C).

TABLE 1

Mechanical properties of Homopolymer (A) and Homopolymer (C)

| Parameter | Unit | Homopolymer (A) | Homopolymer (C) |
|---|---|---|---|
| MFR (230° C./2.16 kg; ISO 1133) | g/10 min | 0.75 | 20 |
| XCS | wt % | 3 | / |
| Flexural modulus | MPa | / | 2000 |
| Tensile modulus | MPa | 1490 | / |
| Notched charpy impact strength, −20° C. | kJ/m$^2$ | 4.5 | 2.5 |
| Isotacticity | % | / | 97.9 |

Homopolymer (A) and homopolymer (C) can be prepared using Borstar® technology in a plant having a loop reactor and a fluidized bed gas-reactor connected in series.

The raw polymers were each pelletized in the presence of standard antioxidants and process stabilizers. The pelletization was done on a twin screw extruder (type PRISM TSE24E, screw diameter 24 mm, L/d ratio 48) with the following temperature profile: Zone 1; Zone 2; Zone 3; Zone 4; Zone 5; of 210° C.; 215° C.; 220° C.; 215° C.; 210° C. accordingly. The screw speed was set to 250 rpm and the throughput to 3 kg/h. The polymers were dried in an oven, assisted by a flow of warm nitrogen, and samples were analyzed.

Heterophasic Polypropylene (B) and Heterophasic Polypropylene (Comparative):

The heterophasic polypropylene (B) and the heterophasic polypropylene (comparative) are elastomer modified polypropylenes of the type of heterophasic compolymers (HECO). However, the IV/Am, the flexural modulus and the tensile modulus of the inventive heterophasic polypropylene (B) have been fine tuned in comparison with the heterophasic polymer (comparative). The inventive heterophasic polypropylene (B) contributes to the better notched charpy impact strength than the softer heterophasic polymer (comparative). The mechanical properties of the heterophasic polypropylene (B) and the heterophasic polypropylene (comparative) are as follows in Table 2.

TABLE 2

Mechanical properties of Heterophasic Polypropylene (B) and Heterophasic Polypropylene (comparative)

| Parameter | Unit | Heterophasic polypropylene (B) | Heterophasic polypropylene (comparative) |
|---|---|---|---|
| Cat/Donor | | BCF20P*/D/BNT | ZN104**/D |
| MFR (230° C./2.16 kg; ISO 1133) (loop) | g/10 min | 55 | 35 |
| MFR (230° C./2.16 kg; ISO 1133) (final) | g/10 min | 11 | 12 |
| $C_2$-total content (final) | wt % | 13 | 16 |
| XCS (final) | wt % | 32 | 30 |
| IV (amorph) | dl/g | 2.5 | 2.0 |
| Split Loop: GPR | | 68/32 | 70/30 |
| Flexural modulus | MPa | 950 | 725 |
| Notched Charpy Impact Strength, −20° C. | kJ/m$^2$ | 11 | 8.5 |

*catalyst described inter alia in EP 591 224 incorporated by reference herewith
**commercial catalyst by Basell The heterophasic polypropylene (B) and the heterophasic polypropylene (comparative) were prepared by using Borstar® technology in a plant having a loop reactor and three fluid bed gas-reactors connected in series. The respective process details can be found in Table 3.

TABLE 3

Preparation of the Heterophasic Polypropylene (B) and Heterophasic Polypropylene (comparative)

| INVENTIVE | | comparative | |
|---|---|---|---|
| Donor | BCF20/D | Donor | ZN104/D |
| Al/Ti ratio [mol/mol] | 200 | Al/Ti ratio [mol/mol] | 7.5-9 |
| Al/donor ratio [mol/mol] | 13.3 | Al/donor ratio [mol/mol] | 3 |
| Loop | | Loop | |
| T [° C.] | 72 | T [° C.] | 69 |
| Pressure [bar] | 55 | Pressure [bar] | 38 |
| $H_2/C_3$ [mol/kmol] | 140 | $H_2/C_3$ [mol/kmol] | 3300 ppm |
| $C_3$ feed [kg/h] | 29900 | $C_3$ feed [kg/h] | 25000 |
| Residence time [h] | 0.67 | Residence time [h] | 50-55 min |
| 1$^{st}$ GPR | | 2$^{nd}$ Loop | |
| T [° C.] | 80 | T [° C.] | 69 |
| Pressure [bar] | 21 | Pressure [bar] | 38 |
| $H_2/C_3$ [mol/kmol] | 140 | $H_2$ | 3300 ppm |
| $C_3$ feed [kg/h] | 3600 | $C_3$ feed [kg/h] | 10000 |
| Residence time [h] | 1.4 | Residence time [h] | 32 |
| $C_2$-content [wt %] - if any | 0 | $C_2$-content [wt %] - if any | 0 |
| MFR [g/10 min] | 55 | MFR [g/10 min] | 35 |
| Split Loop/1$^{st}$ GPR | 58:40 | Split Loop1/2nd loop | 63-66% |
| 2$^{nd}$ GPR | | 1$^{st}$ GPR | |
| T [° C.] | 70 | T [° C.] | 80 |
| Pressure [bar] | 21.5 | Pressure [bar] | 12-13 |
| $H_2/C_2$ [mol/kmol] | 130 | $H_2/C_3$ [mol/mol] | 0.20 |
| $C_2/C_3$ [mol/kmol] | 550 | $C_2/C_2 + C_3$ [mol/mol] | 0.32 |
| $C_3$ feed [kg/h] | 4700 | $C_3$ feed [kg/h] | 1300 |
| Residence time [h] | 0.65 | Residence time [h] | 20 min |
| $C_2$-content [wt %] | 8.5 | $C_2$-content [wt %] | 9 |

TABLE 3-continued

Preparation of the Heterophasic Polypropylene (B) and Heterophasic Polypropylene (comparative)

| INVENTIVE | | comparative | |
|---|---|---|---|
| Donor | BCF20/D | Donor | ZN104/D |
| $3^{rd}$ GPR | | $2^{nd}$ GPR | |
| T [° C.] | 85 | T [° C.] | 80 |
| Pressure [bar] | 14.5 | Pressure [bar] | 12 |
| $H_2/C_2$ [mol/kmol] | 95 | $H_2/C_2$ [mol/mol] | 0.20 |
| $C_2/C_3$ [mol/kmol] | 550 | $C_2/C_2 + C_3$ [mol/mol] | 0.32 |
| $C_2$ feed [kg/h] | 1600 | $C_2$ feed [kg/h] | 1800 |
| Residence time [h] | 0.95 | Residence time [h] | 23 min |
| $C_2$ [wt %] | 13 | $C_2$ [wt %] | 7 |
| Split $2^{nd}$ GPR/$3^{rd}$ GPR | 58:42 | Split $2^{nd}$ GPR/$3^{rd}$ GPR | 0.56 |

After the polymerisation process the material was pelletized as described above for homopolymer (A) and (C).

Preparation of the Polypropylene Composition

The inventive and comparative polypropylene composition was prepared by melt mixing using a twin screw extruder. Details are outlined in Table 4. The mechanical properties of the final polypropylene composition are outlined in Table 5.

TABLE 4

Recipe used for the polypropylene composition of the Inventive Example (IE) and the Comparative Example (CE)

| Ingredient Trade name | IE [wt %] | CE [wt %] |
|---|---|---|
| Homopolymer (A) | 40.01 | 40.01 |
| Heterophasic polypropylene (B) | 19.00 | / |
| Heterophasic polypropylene (comparative) | / | 19.00 |
| Homopolymer (C) | 10.00 | 10.00 |
| Luzenac STEAMIC T1 CA | 30.00 | / |
| Luzenac A20 | / | 30.00 |
| IRGANOX PS 802 FL | 0.40 | 0.40 |
| IRGANOX 1010 FF | 0.24 | 0.24 |
| LIGA CA 860 POWDER | 0.20 | 0.20 |
| HOSTANOX PAR 24 FF | 0.15 | 0.15 |

TABLE 5

Results of mechanical data of the Inventive Example and the Comparative Example

| Parameter | Unit | Inventive Example | Comparative Example | Validation* |
|---|---|---|---|---|
| MFR 230/2.16 | g/10 min | 2.6 | 2.0 | + |
| Filler content | wt % | 29.8 | 29.7 | 0 |
| Tensile modulus | MPa | 3618 | 3165 | ++ |
| Tensile Strength | MPa | 32.9 | 31.1 | 0 |
| Flexural Modulus | MPa | 3702 | 3259 | +++ |
| Flexural Strength | MPa | 49.3 | 45 | + |
| Unnotched Charpy Impact Strength, 23° C. | kJ/m² | 57.1 | 57.0 | 0 |
| Unnotched Charpy Impact Strength, 0° C. | kJ/m² | 29.1 | 26.7 | + |
| HDT Met.A - 1.8 MPa | ° C. | 71.7 | 68 | + |
| HDT Met.B - 0.45 MPa | ° C. | 124.4 | 121.2 | ++ |
| VICAT Met.A - 10N | ° C. | 155.8 | 154.8 | 0 |
| VICAT Met.B - 50N | ° C. | 87.4 | 80.2 | ++ |
| SH in flow | % | 0.9 | 0.9 | 0 |
| SH across flow | % | 0.8 | 0.8 | 0 |
| Instrumented Puncture Test - Plate of 2 mm, 23° C., 4.4 m/s | | | | |
| Maximum Force | N | 1864.8 | 1757.1 | + |
| Puncture Energy | J | 7.1 | 6.2 | + |
| Instrumented Puncture Test - Plate of 2 mm, 0° C., 4.4 m/s | | | | |
| Maximum Force | N | 1020.3 | 717.6 | ++++ |
| Puncture Energy | J | 2.3 | 2.3 | 0 |
| Flexural tests at elevated temperature of 50° C. | | | | |
| FLEXURAL MODULUS | MPa | 1940.6 | 1668.8 | +++ |
| FLEXURAL STRENGTH | MPa | 30 | 27.5 | + |
| FLEXURAL STRAIN AT FLEXURAL STRENGTH | % | 6 | 6.1 | 0 |
| FLEXURAL STRESS AT 3.5% STRAIN | MPa | 27.1 | 24.7 | + |
| FLEXURAL STRESS AT BREAK | MPa | 29.4 | 27 | ++ |
| FLEXURAL STRAIN AT BREAK | % | 7.4 | 7.5 | 0 |
| Flexural tests at elevated temperature of 80° C. | | | | |
| FLEXURAL MODULUS | MPa | 1188.3 | 1025.5 | ++ |
| FLEXURAL STRENGTH | MPa | 19.3 | 17.8 | + |
| FLEXURAL STRAIN AT FLEXURAL STRENGTH | % | 6.2 | 6.4 | 0 |
| FLEXURAL STRESS AT 3.5% STRAIN | MPa | 17.2 | 15.7 | + |
| FLEXURAL STRESS AT BREAK | MPa | 18.9 | 17.4 | + |
| FLEXURAL STRAIN AT BREAK | % | 7.7 | 7.8 | 0 |

*Validation of performance of Inventive Example with respect to Comparative Example: ++++ outstanding; +++ excellent; ++ very good; + good; 0 unchanged Taken together, the Inventive Example shows a clear improvement in its properties over the Comparative Example regarding the tensile modulus, the flexural modulus, the heat deflection temperature and in the VICAT-Test. Furthermore the performance of the Inventive Example in the Instrumented Puncture Test at 0° C. is outstanding when compared with the Comparative Example. The same is true for the flexural properties at elevated temperatures of 50° C. and 80° C., respectively. These improvements are especially remarkable, since the values resulted in the test of Unnotched Charpy Resistance, tensile strength, flexural strength and in the instrumented puncture test at 23° C. remain unchanged or are even improved.

Therefore the polypropylene composition of the present invention performs as good as the conventional composition in temperature resistance, stiffness and sagging behavior. However, in contrast to the conventional polypropylene composition the present polypropylene composition is at low temperatures still ductile and does not embrittle. Accordingly, the performance of the present polypropylene composition at low temperatures is strongly improved.

The invention claimed is:
1. A polypropylene composition consisting of
   55 to 79 wt % base polymer mix;
   18 to 44.5 wt % talc; and
   0.5 to 3 wt % additives
based on the total weight of the polypropylene composition,
   the base polymer mix containing a XCU fraction and a XCS fraction and the XCU fraction being present in an amount of 91 to 98 wt % and the XCS fraction being present in an amount of 2 to 9 wt %;
   the base polymer mix containing a comonomer content of less than 5 wt % with respect to the base polymer mix;

the talc having a d50 median particle size of 1.0 to 3.0 μm when measured according to ISO 13317-3 15 using a Sedigraph; and the composition having a MFR (230° C./2.16 kg; ISO 1133) of 1 to 10 g/10 min;

wherein the base polymer mix is obtained by blending:
homopolymer (A) having an MFR (230° C./2.16 kg; ISO 1133) of 0.3 to 2 g/10 min;
heterophasic polymer (B) having a flexural modulus of more than 850 MPa; and
homopolymer (C) having an MFR (230° C./2.16 kg; ISO 1133) of more than 10 g/10 min.

2. A polypropylene composition according to claim 1, wherein the talc has a d95 cutoff particle size of 4.5 to 7.5 μm when measured according to ISO 13317-3 using a Sedigraph.

3. A polypropylene composition according to claim 2, wherein the talc has a specific surface area of 7.5 to 9 m2/g determined as the BET surface according to DIN 66131/2.

4. A polypropylene composition according to claim 2, wherein the tensile modulus/talc ratio is more than 110 MPa/wt % when the tensile modulus is measured according to ISO 527-2 and the weight of the talc is based on the total weight of the polypropylene composition.

5. A polypropylene composition according to claim 2, wherein the flexural modulus/talc ratio is more than 113 MPa/wt % when the flexural modulus is measured according to ISO 178 and weight of talc is based on the total weight of the polypropylene composition.

6. A polypropylene composition according to claim 2, wherein the maximum force in the Instrumented Puncture Test at 0° C. is more than 800 N when measured according to ISO 6603-2.

7. A polypropylene composition according to claim 2, wherein the composition having a MFR (230° C./2.16 kg; ISO 1133) of 2.1 to 3.5 g/10 min.

8. A polypropylene composition according to claim 1, wherein the talc has a specific surface area of 7.5 to 9 m2/g determined as the BET surface according to DIN 66131/2.

9. A polypropylene composition according to claim 1, wherein the base polymer mix is obtained by blending
50 to 65 wt % homopolymer (A);
20 to 32 wt % heterophasic polypropylene (B) having an MFR (230° C./2.16 kg; ISO 1133) of 5 to 20 g/10 min; and
10 to 20 wt % homopolymer (C)
based on the total weight of the base polymer mix.

10. A polypropylene composition according to claim 9, wherein the heterophasic polypropylene (B) has a XCS content of 25 to 39 wt %.

11. A polypropylene composition according to claim 9, wherein the XCS fraction of the heterophasic polypropylene (B) has an intrinsic viscosity of 2.1 to 2.9 dl/g when measured in decalin at 135° C. according to DIN EN ISO 1628-1 and -3.

12. A polypropylene composition according to claim 9, wherein the homopolymer (C) is a nucleated homopolymer.

13. A polypropylene composition according to claim 1, wherein the tensile modulus/talc ratio is more than 110 MPa/wt % when the tensile modulus is measured according to ISO 527-2 and the weight of the talc is based on the total weight of the polypropylene composition.

14. A polypropylene composition according to claim 1, wherein the flexural modulus/talc ratio is more than 113 MPa/wt % when the flexural modulus is measured according to ISO 178 and weight of talc is based on the total weight of the polypropylene composition.

15. A polypropylene composition according to claim 1, wherein the maximum force in the Instrumented Puncture Test at 0° C. is more than 800 N when measured according to ISO 6603-2.

16. A polypropylene composition according to claim 1, wherein the composition having a MFR (230° C./2.16 kg; ISO 1133) of 2.1 to 3.5 g/10 min.

17. A polypropylene composition according to claim 1, wherein the heterophasic polypropylene (B) is produced in 4 sequential reactors.

18. A polypropylene composition according to claim 17, wherein the 4 sequential reactors are a combination of one loop reactor and tree gas phase reactors coupled in series.

19. A polypropylene composition according to claim 18, wherein the production of the heterophasic polypropylene (B) involves
the preparation of a first polymer in a loop reactor having an MFR (230° C./2.16 kg; ISO 1133) of 50 to 60 g/10 min;
transferring the product to a first gas phase reactor for the preparation of a second polymer having an MFR (230° C./2.16 kg; ISO 1133) of 50 to 60 g/10 min;
transferring the product to a second gas phase reactor for the preparation of a third polymer having an MFR (230° C./2.16 kg; ISO 1133) of 10 to 25 g/10 min; and
transferring the product to a third gas phase reactor for the preparation of the heterophasic polypropylene (B) having an MFR (230° C./2.16 kg; ISO 1133) of 5 to 20 g/10 min and a flexural modulus of more than 850 MPa when measured according to ISO 178.

20. An article made from the polypropylene composition according to claim 1.

21. Process for the production of a polypropylene composition by blending 55 to 79 wt % base polymer mix, 18 to 44.5 wt % talc, 0.5 to 3 wt % additives, based on the total weight of the polypropylene composition, whereby the base polymer mix is
50 to 65 wt % homopolymer (A) having an MFR (230° C./2.16 kg; ISO 1133) of 0.3 to 2 g/10 min;
20 to 32 wt % heterophasic polypropylene (B) having an MFR (230° C./2.16 kg;
ISO 1133) of 5 to 20 g/10 min and a flexural modulus of more than 850 MPa when measured according to ISO 178; and
10 to 20 wt % homopolymer (C) having an MFR (230° C./2.16 kg; ISO 1133) of more than 10 g/10 min
based on the total weight of the base polymer mix.

* * * * *